United States Patent
Sanada

(10) Patent No.: US 8,460,456 B2
(45) Date of Patent: *Jun. 11, 2013

(54) INFRARED REFLECTING BLACK PIGMENT, PAINT AND RESIN COMPOSITION

(75) Inventor: Kazutoshi Sanada, Hiroshima-ken (JP)

(73) Assignee: Toda Kogyo Corporation, Otake-shi, Hiroshima-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/067,287

(22) Filed: May 20, 2011

(65) Prior Publication Data

US 2011/0247524 A1    Oct. 13, 2011

Related U.S. Application Data

(63) Continuation-in-part of application No. 11/883,826, filed on Feb. 1, 2008, now abandoned, which is a continuation-in-part of application No. PCT/JP2006/302191, filed on Feb. 8, 2006.

(30) Foreign Application Priority Data

Feb. 10, 2005 (JP) ................................. 2005-035172
Dec. 29, 2005 (JP) ................................. 2005-380578

(51) Int. Cl.
*C09C 1/245* (2006.01)
*C09D 17/005* (2006.01)
*C01P 2006/62* (2006.01)

(52) U.S. Cl.
USPC .......................................... 106/459; 106/400

(58) Field of Classification Search
USPC .............. 106/459; 430/25; 524/435; 523/135
See application file for complete search history.

(56) References Cited

U.S. PATENT DOCUMENTS

| | | | | |
|---|---|---|---|---|
| 4,426,465 A | * | 1/1984 | Maki et al. ..................... | 523/135 |
| 5,780,195 A | * | 7/1998 | Nava .......................... | 430/109.2 |
| 5,814,434 A | * | 9/1998 | Nakamura et al. .............. | 430/25 |
| 6,001,533 A | | 12/1999 | Sega et al. | |
| 6,024,890 A | | 2/2000 | Poganiuch et al. | |

FOREIGN PATENT DOCUMENTS

| | | | |
|---|---|---|---|
| CN | 200680004315.7 | | 2/2006 |
| EP | 06713334.8 | | 2/2006 |
| JP | 59-075960 | | 4/1984 |
| JP | 62-100417 | | 5/1987 |
| JP | 2002-02119 | | 1/1993 |
| JP | 2000-72990 | | 3/2000 |
| JP | 2000-264639 | | 9/2000 |
| JP | 2001-311049 | | 11/2001 |
| JP | 2002-188021 | | 7/2002 |
| JP | 2002-020119 | * | 1/2003 |
| JP | 2006-018011 | | 1/2006 |
| JP | 2006-018019 | | 1/2006 |

OTHER PUBLICATIONS

International Search Report mailed Mar. 28, 2006 (English and Japanese text).

* cited by examiner

*Primary Examiner* — Pegah Parvini
(74) *Attorney, Agent, or Firm* — Nixon & Vanderhye P.C.

(57) ABSTRACT

The present invention relates to an infrared reflecting black pigment which comprises a composite oxide containing Fe, Co and at least one metal selected from the group consisting of Al, Mg, Ca, Sr, Ba, Ti, Zn, Sn, Zr, Si and Cu; has an average plate surface diameter of 0.02 to 5.0 μm, a blackness (L* value) of not more than 30, an average reflectance of not more than 10% in a visible light wavelength range of 250 to 780 nm and an average reflectance of not less than 35% in an infrared wavelength range of 780 to 2500 nm. There is provided an infrared reflecting black pigment which is capable of producing a heat-shielding paint containing no harmful elements and exhibiting an excellent infrared reflecting property.

14 Claims, No Drawings

INFRARED REFLECTING BLACK PIGMENT, PAINT AND RESIN COMPOSITION

CROSS REFERENCES TO RELATED APPLICATIONS

This is a continuation-in-part application of Ser. No. 11/883,826 filed Feb. 1, 2008 now abandoned, which in turn is a continuation-in-part of International Application No. PCT/JP2006/302191, filed 8 Feb. 2006, which designated the US and claims benefit of JP 2005-035172, filed 10 Feb. 2005 and JP 2005-380578, filed 29 Dec. 2005, the entire contents of each of which are hereby incorporated by reference.

BACKGROUND OF THE INVENTION

The present invention relates to an infrared reflecting black pigment, a paint and a resin composition, and more particularly, to an infrared reflecting black pigment which is capable of providing a heat-shielding paint containing no harmful elements and exhibiting an excellent infrared reflecting property, and a paint and a resin composition containing the pigment.

In roads, buildings, storage tanks, automobiles, ships, etc., which are used or located out of doors, an inside temperature thereof is increased when exposed to solar radiation. For this reason, an outside surface of buildings, automobiles, etc., has been painted with a white to light color to reflect sunlight thereon, thereby enhancing a heat-shielding effect thereof to some extent.

However, in particular, roofs of buildings exposed outside are frequently painted with a deep to black color to make stains or contamination thereon unremarkable. Buildings, automobiles, etc., whose outside surface is painted with a deep color to black color, tend to absorb sunlight as compared to those having an outside surface painted with a light to white color, and tend to suffer from considerable increase in inside temperature when exposed to solar radiation. Such a high inside temperature of buildings, automobiles, etc., is undesirable for transportation or storage of products.

From the standpoint of saving energies required for preventing global warming-up problems, it has been strongly demanded to suppress the increase in inside temperature of buildings, automobiles, etc., whose outside surface exhibits deep color to black color.

In order to prevent the increase in inside temperature of buildings, automobiles, etc., whose outside surface is painted with a deep color to black color, there have been conventionally used heat-shielding black paints. For example, there has been proposed a black calcined pigment having a spinel structure composed of CoO, $Cr_2O_3$ and $Fe_2O_3$ (refer to Japanese Patent Application Laid-Open (KOKAI) No. 2000-72990). However, the black calcined pigment contains Cr as a harmful substance and has an average reflectance of less than 35% in an infrared wavelength range of 780 to 2500 nm, and, as a result, may fail to exhibit a sufficient heat-shielding effect.

There has been proposed a black pigment in the form of a calcined pigment containing $Fe_2O_3$ as an essential component together with $Cr_2O_3$, $Mn_2O_3$ or NiO (refer to Japanese Patent Application Laid-Open (KOKAI) No. 2001-311049). However, the black calcined pigment contains Cr as a harmful substance.

There has also been proposed a black composite oxide made of a rare earth element, an alkali earth metal and iron (refer to Japanese Patent Application Laid-Open (KOKAI) No. 2004-83616). However, the black calcined pigment may fail to exhibit a sufficient heat-shielding effect.

In addition, there has been proposed a strontium iron oxide perovskite having an excellent blackness (refer to Japanese Patent Application Laid-Open (KOKAI) No. 2000-264639). However, the strontium iron oxide perovskite has an average reflectance of not more than 10% in a visible light wavelength range of 250 to 780 nm and an average reflectance of less than 35% in an infrared wavelength range of 780 to 2500 nm and, therefore, may fail to exhibit a sufficient heat-shielding effect.

Further, there has been proposed a magnesium/aluminum-containing iron oxide having an excellent blackness (refer to Japanese Patent Application Laid-Open (KOKAI) No. 2003-238164). However, the iron oxide has an average reflectance of not more than 10% in a visible light wavelength range of 250 to 780 nm and an average reflectance of less than 30% in an infrared wavelength range of 780 to 2500 nm and, therefore, may fail to exhibit a sufficient heat-shielding effect.

SUMMARY OF THE INVENTION

The present invention has been made in view of the above conventional problems. An object of the present invention is to provide an infrared reflecting black pigment containing no harmful elements and exhibiting an excellent infrared reflecting property. Another object of the present invention is to provide a paint which contains a black pigment containing no harmful elements and exhibiting an excellent infrared reflecting property. The other object of the present invention is to provide a resin composition which contains a black pigment containing no harmful elements and exhibiting an excellent infrared reflecting property.

As a result of the present inventors' earnest study for solving the above problems, it has been found that a composite oxide containing Fe, Co and at least one metal selected from the group consisting of Al, Mg, Ca, Sr, Ba, Ti, Zn and Cu and having an average particle diameter of 0.02 to 5.0 μm, contains no harmful elements, and can exhibit an excellent infrared reflecting property although it is a black pigment.

The present invention has been attained on the basis of the above finding. To accomplish the aims, in a first aspect of the present invention, there is provided an infrared reflecting black pigment comprising a composite oxide containing Fe, Co and at least one metal selected from the group consisting of Al, Mg, Ca, Sr, Ba, Ti, Zn, Sn, Zr, Si and Cu, said black pigment having an average particle diameter of 0.02 to 5.0 μm and a blackness (L* value) of not more than 30.

In a second aspect of the present invention, there is provided an infrared reflecting black pigment comprising a composite oxide containing Fe, Co and at least one metal selected from the group consisting of Mg, Ca, Sr, Ba, Ti, Zn and Cu, said black pigment being in the form of plate-shaped particles having an average particle diameter of 0.20 to 5.0 um and a blackness (L* value) of not more than 30.

In a third aspect of the present invention, there is provided an infrared reflecting black pigment comprising a composite oxide containing Fe, Co, Al and at least one metal selected from the group consisting of Mg, Ca, Sr, Ba, Ti, Zn, Sn, Zr, Si and Cu, and having an average particle diameter of 0.02 to 2.0 μm and a blackness (L* value) of not more than 30.

In a fourth aspect of the present invention, there is provided a paint comprising the above infrared reflecting black pigment.

In a fifth aspect of the present invention, there is provided a resin composition comprising the above infrared reflecting black pigment.

DETAILED DESCRIPTION OF THE INVENTION

The present invention is described in detail below. First, the infrared reflecting black pigment of the present invention (hereinafter occasionally referred to merely as a "black pigment") is described. The infrared reflecting black pigment according to the first aspect of the present invention, comprises a composite oxide containing Fe, Co and at least one metal selected from the group consisting of Al, Mg, Ca, Sr, Ba, Ti, Zn and Cu, and has an average particle diameter of 0.02 to 5.0 µm and a blackness (L* value) of not more than 30.

The Fe content in the black pigment according to the first aspect of the present invention is usually 10 to 90 mol % on the basis of whole metal elements contained in the black pigment. The Co content in the black pigment according to the first aspect of the present invention is usually 1.0 to 70 mol % on the basis of whole metal elements contained in the black pigment. The content of the at least one metal selected from the group consisting of Al, Mg, Ca, Sr, Ba, Ti, Zn and Cu in the black pigment according to the first aspect of the present invention is usually 1.0 to 70 mol % on the basis of whole metal elements contained in the black pigment.

The infrared reflecting black pigment according to the first aspect of the present invention usually has a spinel-type or magnetoplumbite-type crystal structure. Meanwhile, the infrared reflecting black pigment inevitably contains impurities derived from various raw materials. Examples of the impurities may include Cr, etc. For example, the Cr content in the black pigment is usually not more than 1% by weight, in particular, the content of $Cr^{6+}$ is usually not more than 10 ppm.

The upper limit of the blackness (L* value) of the black pigment according to the first aspect of the present invention is usually about 30.0, preferably 28.0 and more preferably 25.0. When the blackness (L* value) of the black pigment is more than 30, the resultant pigment may fail to exhibit an excellent blackness. The lower limit of the blackness (L* value) of the black pigment is usually about 5.0.

As to an infrared reflecting property of the black pigment according to the first aspect of the present invention, the average reflectance thereof in a visible light wavelength range of 250 to 780 nm is usually not more than 10%, and the average reflectance thereof in an infrared wavelength range of 780 to 2500 nm is usually not less than 35%. When the average reflectance of the black pigment in an infrared wavelength range of 780 to 2500 nm is less than 35%, the infrared reflecting property of the black pigment tends to be insufficient.

Next, there is described the infrared reflecting black pigment according to the second aspect of the present invention which comprises a composite oxide containing Fe, Co and at least one metal selected from the group consisting of Mg, Ca, Sr, Ba, Ti, Zn and Cu, and is in the form of plate-shaped particles having an average particle diameter of 0.02 to 5.0 µm and a blackness (L* value) of not more than 30.

The composite oxide constituting the infrared reflecting black pigment according to the second aspect of the present invention contains Fe, Co and at least one metal selected from the group consisting of Mg, Ca, Sr, Ba, Ti, Zn and Cu. Specific examples of the composite oxide may include oxides having a spinel-type crystal structure such as Co—Zn—Fe-based composite oxides and Co—Mg—Fe-based composite oxides; and oxides having a magnetoplumbite-type crystal structure such as Ba—Co—Ti—Fe-based composite oxides and Sr—Co—Ti—Fe-based composite oxides.

The Fe content in the black pigment according to the second aspect of the present invention is usually 10 to 90 mol % and preferably 20 to 90 mol % on the basis of whole metal elements contained in the black pigment. The Co content in the black pigment according to the second aspect of the present invention is usually 1.0 to 70 mol % and preferably 1.0 to 60 mol % on the basis of whole metal elements contained in the black pigment. The total content of Fe and Co in the black pigment according to the second aspect of the present invention is usually 40 to 98 mol % and preferably 40 to 95 mol % based on whole metal elements contained in the black pigment.

When the Fe and Co contents in the black pigment are respectively out of the above-specified ranges, the blackness (L* value) of the black pigment tends to exceed 30, so that the average reflectance thereof in an infrared wavelength range of 780 to 2500 nm tends to be lowered to less than 35%.

The content of the at least one metal selected from the group consisting of Mg, Ca, Sr, Ba, Ti, Zn and Cu in the black pigment according to the second aspect of the present invention is usually 1.0 to 60 mol % and preferably 1.0 to 50 mol % on the basis of whole metal elements contained in the black pigment.

The average particle diameter of the black pigment according to the second aspect of the present invention is usually 0.02 to 5.0 µm, preferably 0.05 to 2.0 µm, more preferably 0.20 to 1.50 µm and still more preferably 0.25 to 1.50 µm. When the average particle diameter of the black pigment is more than 5.0 µm, the resultant pigment has a too large particle size, resulting in poor tinting strength thereof. When the average particle diameter of the black pigment is less than 0.02 µm, it may be difficult to disperse the resultant pigment in a vehicle. The black pigment according to the second aspect of the present invention usually has a plate shape, and the average particle size of the black pigment means an average plate surface diameter of the plate-shaped particles.

The thickness of the black pigment according to the second aspect of the present invention is usually 0.01 to 1.0 µm, preferably 0.10 to 0.95 µm and more preferably 0.15 to 0.90 µm. When the thickness of the black pigment is more than 1.0 µm, the resultant pigment has a too large particle size, resulting in poor tinting strength thereof. When the thickness of the black pigment is less than 0.01 µm, it may be difficult to disperse the resultant pigment in a vehicle.

The plate ratio (particle diameter/thickness) of the black pigment according to the second aspect of the present invention is usually 1.2:1 to 20:1 and preferably 1.3:1 to 15:1. When the plate ratio of the black pigment is more than 20:1, or less than 1.2:1, it may be difficult to disperse the resultant pigment in a vehicle.

The BET specific surface area value of the black pigment according to the second aspect of the present invention is usually 1.0 to 20 $m^2/g$, preferably 1.5 to 15 $m^2/g$ and more preferably 1.8 to 13 $m^2/g$. When the BET specific surface area value of the black pigment is less than 1.0 $m^2/g$, the resultant pigment particles tend to become coarse, or sintering tends to be caused within or between the particles, resulting in poor tinting strength thereof.

The a* value of the black pigment according to the second aspect of the present invention is usually 0.05 to 10 and preferably 0.10 to 5.0. When the a* value is out of the above-specified range, the resultant pigment may fail to exhibit an excellent blackness.

In addition, as to an infrared reflecting property of the black pigment according to the second aspect of the present invention, the average reflectance thereof in an infrared wavelength range of 780 to 2500 nm is usually not less than 35% and preferably not less than 37%. When the average reflectance in an infrared wavelength range of 780 to 2500 nm is less than 35%, the resultant pigment may fail to exhibit a sufficient infrared reflecting property.

Next, there is described the infrared reflecting black pigment according to the third aspect of the present invention which comprises a composite oxide containing Fe, Co, Al and at least one metal selected from the group consisting of Mg, Ca, Sr, Ba, Ti, Zn, Sn, Zr, Si and Cu, and has an average particle diameter of 0.02 to 2.0 um and a blackness (L* value) of not more than 30.0.

The composite oxide constituting the infrared reflecting black pigment according to the third aspect of the present invention contains Fe, Co, Al and at least one metal selected from the group consisting of Mg, Ca, Sr, Ba, Ti, Zn, Sn, Zr, Si and Cu, and usually has a spinel-type crystal structure. Among the metals to be selected, preferred are Mg, Sr, Ba, Ti, Zn, Zr and Si.

The Fe content in the black pigment according to the third aspect of the present invention is usually 10 to 90 mol %, preferably 10 to 80 mol % and more preferably 10 to 50 mol % on the basis of whole metal elements contained in the black pigment. The Co content in the black pigment according to the third aspect of the present invention is usually 1.0 to 70 mol %, preferably 3.0 to 60 mol % and more preferably 5 to 50 mol % on the basis of whole metal elements contained in the black pigment. The Al content in the black pigment according to the third aspect of the present invention is usually 1.0 to 70 mol %, preferably 3.0 to 68 mol % and more preferably 5 to 65 mol % on the basis of whole metal elements contained in the black pigment.

The total content of Fe, Co and Al in the black pigment according to the third aspect of the present invention is usually 20 to 98 mol %, preferably 30 to 95 mol % and more preferably 40 to 95 mol % on the basis of whole metal elements contained in the black pigment.

When the contents of Fe, Co and Al in the black pigment according to the third aspect of the present invention are respectively out of the above-specified ranges, the resultant pigment tends to have a blackness (L* value) of more than 30, and, as a result, tends to exhibit an average reflectance of less than 35% in an infrared wavelength range of 780 to 2500 nm.

The content of the at least one metal selected from the group consisting of Mg, Ca, Sr, Ba, Ti, Zn, Sn, Zr, Si and Cu in the black pigment according to the third aspect of the present invention is usually 1.0 to 60 mol % and preferably 1.0 to 50 mol % on the basis of whole metal elements contained in the black pigment.

The average particle diameter of the black pigment according to the third aspect of the present invention is usually 0.02 to 2.0 μm, preferably 0.025 to 1.5 μm and more preferably 0.040 to 1.20 μm. When the average particle diameter of the black pigment is more than 2.0 μm, the resultant pigment tends to have a too large particle size, resulting in poor tinting strength thereof. When the average particle diameter of the black pigment is less than 0.02 μm, it may be difficult to disperse the resultant pigment in a vehicle.

The BET specific surface area value of the black pigment according to the third aspect of the present invention is usually 1.0 to 100 m$^2$/g, preferably 1.5 to 75 m$^2$/g and more preferably 1.8 to 60 m$^2$/g. When the BET specific surface area value of the black pigment is less than 1.0 m$^2$/g, the resultant pigment particles tend to become coarse, or sintering tends to be caused within or between the particles, resulting in poor tinting strength thereof.

The a* value of the black pigment according to the third aspect of the present invention is usually −5 to +10 and preferably −1 to +5. When the a* value of the black pigment is out of the above-specified range, the resultant pigment may fail to exhibit an excellent blackness. The b* value of the black pigment according to the third aspect of the present invention is usually −5 to +10 and preferably −1 to +5. When the b* value of the black pigment is out of the above-specified range, the resultant pigment may fail to exhibit an excellent blackness.

In addition, as to an infrared reflecting property of the black pigment according to the third aspect of the present invention, the average reflectance of the black pigment in an infrared wavelength range of 780 to 2500 nm is usually not less than 35% and preferably not less than 37%. When the average reflectance of the black pigment is less than 35%, the resultant pigment may fail to exhibit a sufficient infrared reflecting property.

In accordance with the third aspect of the present invention, the obtained pigment particles may be further coated with a compound of at least one element selected from the group consisting of Si, Al, Zr and Ti. The amount of the compound coated on the pigment particles is usually 0.1 to 10% by weight and preferably 0.1 to 8% by weight on the basis of the weight of the black pigment. The black pigment coated with such a compound can be further enhanced in dispersibility in a paint and a resin composition.

Next, the process for producing the infrared reflecting black pigment according to the present invention is described.

The infrared reflecting black pigment according to the present invention may be produced by mixing various raw materials with each other and then calcining the resultant mixture. As the starting materials, there may be used oxides, carbonates, nitrates and sulfates of various metal elements described above. The mixing method of the starting materials is not particularly limited as long as these materials can be uniformly mixed with each other, and there may be used either a wet-mixing method or a dry-mixing method. The heat-calcining temperature is usually 700 to 1200° C., and the heating atmosphere may be an atmospheric air. The particles obtained after heating may be washed with water and then pulverized by ordinary methods.

The surface of the particles of the infrared reflecting black pigment produced according to the present invention may be coated with a compound of at least one element selected from the group consisting of Si, Al, Zr and Ti. The surface coating treatment may be conducted by an ordinary method such as a wet method and a dry method.

In the wet coating method, for example, a soluble compound of at least one element selected from the group consisting of Si, Al, Zr and Ti may be added to and mixed in a wet-dispersed slurry of the infrared reflecting black pigment while controlling the pH value thereof with an acid or an alkali to coat the pigment particles with the soluble compound. In the dry coating method, for example, by using a mixing apparatus such as a Henschel mixer, the infrared reflecting black pigment may be coated with a coupling agent containing at least one element selected from the group consisting of Si, Al, Zr and Ti.

Next, the paint containing the black pigment according to the fourth aspect of the present invention is described. The paint of the present invention composes the black pigment and a paint base material.

The amount of the black pigment blended in the paint is usually 0.5 to 100 parts by weight on the basis of 100 parts by weight of the paint base material. In the consideration of a good handling property of the obtained paint, the amount of the black pigment blended is preferably 1.0 to 100 parts by weight.

The paint base material may comprise a resin, a solvent and, if required, an optional component such as fats and oils, a defoaming agent, an extender pigment, a drying accelerator, a surfactant, a curing accelerator and an assistant.

As the resin, there may be used various resins ordinarily used for solvent-based paints or oil-based printing inks. Specific examples of the resin may include acrylic resins, alkyd resins, polyester resins, polyurethane resins, epoxy resins, phenol resins, melamine resins, amino resins, vinyl chloride resins, silicone resins, rosin-based resins such as gum rosins and lime rosins, maleic acid resins, polyamide resins, nitrocellulose, ethylene-vinyl acetate copolymer resins, rosin-modified resins such as rosin-modified phenol resins and rosin-modified maleic acid resins, and petroleum resins. In particular, as the resins for water-based paints, there may be used those resins ordinarily used for water-based paints or water-based inks. Specific examples of the resins for water-based paints may include water-soluble acrylic resins, water-soluble styrene-maleic acid resins, water-soluble alkyd resins, water-soluble melamine resins, water-soluble urethane emulsion resins, water-soluble epoxy resins, water-soluble polyester resins, etc.

As the solvent, there may be used those solvents ordinarily used for solvent-based paints. Specific examples of the solvent may include soybean oil, toluene, xylene, a thinner, butyl acetate, methyl acetate, methyl isobutyl ketone, methyl cellosolve, ethyl cellosolve, propyl cellosolve, butyl cellosolve, glycol ether-based solvents such as propylene glycol monomethyl ether, ester-based solvents such as ethyl acetate, butyl acetate and amyl acetate, aliphatic hydrocarbon-based solvents such as hexane, heptane and octane, alicyclic hydrocarbon-based solvents such as cyclohexane, petroleum-based solvents such as mineral spirits, ketone-based solvents such as acetone and methyl ethyl ketone, alcohol-based solvents such as methyl alcohol, ethyl alcohol, propyl alcohol and butyl alcohol, and aliphatic hydrocarbons.

As the solvents for water-based paints, there may be used water and those solvents ordinarily used for water-based paints. Specific examples of the solvents for water-based paints may include water-soluble organic solvents, e.g., alcohol-based solvents such as ethyl alcohol, propyl alcohol and butyl alcohol, glycol ether-based solvents such as methyl cellosolve, ethyl cellosolve, propyl cellosolve and butyl cellosolve, oxyethylene or oxypropylene addition polymers such as diethylene glycol, triethylene glycol, polyethylene glycol, dipropylene glycol, tripropylene glycol and polypropylene glycol, alkylene glycols such as ethylene glycol, propylene glycol and 1,2,6-hexanetriol, glycerol, 2-pyrrolidone, and mixtures of these solvents.

Examples of the fats and oils may include boiled oils obtained by processing dry oils such as linseed oil, tung oil, oiticica oil and safflower oil.

Examples of the defoaming agent may include commercially available products such as "NOPCO 8034 (tradename)", "SN DEFOAMER 477 (tradename)", "SN DEFOAMER 5013 (tradename)", "SN DEFOAMER 247 (tradename)" and "SN DEFOAMER 382 (tradename)" all produced by SAN NOPCO LIMITED and "ANTI-FOAM 08 (tradename)" and "EMULGEN 903 (tradename)" both produced by Kao Corp.

Next, the resin composition containing the black pigment according to the fifth aspect of the present invention is described. The resin composition of the present invention is composed of the black pigment and a resin composition base material.

The resin composition base material may include a known thermoplastic resin, and various optional additives such as a lubricant, a plasticizer, an antioxidant, an ultraviolet absorber and various stabilizers.

The amount of the black pigment blended in the resin composition is usually 0.01 to 200 parts by weight on the basis of 100 parts by weight of the resin. In particular, in the consideration of a good handling property of the obtained resin composition, the amount of the black pigment blended therein is preferably 0.05 to 150 parts by weight and more preferably 0.1 to 100 parts by weight.

Examples of the resin contained in the resin composition may include polyolefins such as polyethylene, polypropylene, polybutene and polyisobutylene; thermoplastic resins such as polyvinyl chloride, polymethyl pentene, polyethylene terephthalate, polybutylene terephthalate, polystyrene, styrene-acrylate copolymers, styrene-vinyl acetate copolymers, acrylonitrile-butadiene-styrene copolymers, acrylonitrile-EPDM-styrene copolymers, acrylic resins, polyamides, polycarbonates, polyacetals and polyurethanes; rosin-modified maleic acid resins; phenol resins; epoxy resins; polyester resins; silicone resins; rosin esters; rosins; natural rubbers; and synthetic rubbers.

The amount of the additives added is usually not more than 50% by weight on the basis of the total weight of the black pigment and the resin. When the content of the additives in the resin composition is more than 50% by weight, the obtained resin composition tends to be deteriorated in moldability.

The resin composition may be produced by previously intimately mixing the raw resin material with the black pigment, and then applying a strong shear force to the resultant mixture under heating by using a kneader or an extruder to deaggregate agglomerated particles of the black pigment and uniformly disperse the black pigment in the resin composition. Then, the resultant resin composition may be molded into a desired shape according to the objects and requirements upon use.

Also, the resin composition of the present invention may be produced from master batch pellets. The master batch pellets may be produced by mixing a binder resin as the paint base material or the resin composition base material with the black pigment by using a mixing apparatus such as a ribbon blender, a Nauter mixer, a Henschel mixer and a super mixer, and then kneading and molding the resultant mixture by using a known single-screw or twin-screw kneading extruder, etc., followed by cutting the resultant molded material, or by subjecting the resultant mixture to kneading, pulverizing and molding by using a Banbury mixer, a pressing kneader, etc., followed by cutting the resultant molded material. Upon feeding the binder resin and the black pigment to the kneader, these materials may be respectively fed thereto at predetermined ratios, or a mixture of both the materials may be fed thereto.

The average major axis diameter of the master batch pellets is usually 1 to 6 mm and preferably 2 to 5 mm, whereas the average minor axis diameter thereof is usually 2 to 5 mm and preferably 2.5 to 4 mm. When the average major axis diameter of the master batch pellets is less than 1 mm, the workability upon production of the pellets tends to be deteriorated. When the average major axis diameter of the master batch pellets is more than 6 mm, the difference in size between the master batch pellets and diluting binder resin pellets tends to be considerably large, so that it may be difficult to sufficiently disperse the pellets in the diluting binder resin. The master batch pellets may have various shapes such as, for example, an amorphous shape, a granular shape such as a spherical shape, a cylindrical shape, a flake-like shape, etc.

The binder resin used for production of the master batch pellets may be the same as the resin used in the resin composition. Meanwhile, the composition of the binder resin used in the master batch pellets may be the same as or different from that of the diluting binder resin. When using the resin having a different composition from that of the diluting binder resin, the resins to be used may be determined in the consideration of various properties so as to attain a good compatibility between these resins.

The amount of the black pigment blended in the master batch pellets is usually 1 to 200 parts by weight, preferably 1 to 150 parts by weight and more preferably 1 to 100 parts by weight on the basis of 100 parts by weight of the binder resin. When the amount of the black pigment blended in the master batch pellets is less than 1 part by weight, the master batch pellets tend to show an insufficient melt viscosity upon melt-kneading, so that it may be difficult to suitably disperse and mix the black pigment in the resin composition. When the amount of the black pigment blended in the master batch pellets is more than 200 part by weight, the amount of the binder resin tends to be comparatively lower than that of the black pigment, so that it may be difficult to suitably disperse and mix the black pigment in the resin composition. Further, a slight change in amount of the master batch pellets added tends to cause a considerable change in content of the black pigment in the resin composition, so that it may be difficult to attain a desired content of the black pigment in the resin composition, resulting in severe mechanical abrasion thereof.

The infrared reflecting black pigment of the present invention is characterized by containing no harmful elements and exhibiting a high infrared reflecting property.

The reason why the infrared reflecting black pigment of the present invention can exhibit a high infrared reflecting property, is considered by the present inventors as follows, though it is not clearly determined. That is, it is considered that (1) by incorporating, in addition to Fe and Co, at least one metal selected from the group consisting of Mg, Ca, Sr, Ba, Ti, Zn and Cu, or (2) by incorporating, in addition to Fe, Co and Al, at least one metal selected from the group consisting of Mg, Ca, Sr, Ba, Ti, Zn, Sn, Zr, Si and Cu, the resultant pigment can be enhanced in reflectance in an infrared wavelength range of 780 to 2500 nm.

Further, it is considered by the present inventors that the black pigment according to the second aspect of the present invention tends to be readily oriented in parallel to the surface of a coating film due to the plate-shaped particles and, therefore, can form a clearance-free uniform coating surface, resulting in enhanced infrared reflecting property of the resultant coating film.

Also, the infrared reflecting black pigment of the present invention contains no harmful metal elements such as $Cr^{6+}$ and, therefore, can provide a safe pigment. The infrared reflecting black pigment of the present invention exhibits a good blackness and an excellent infrared reflecting property and, therefore, is suitable as an infrared reflecting black pigment.

In accordance with the present invention, there are provided an infrared reflecting black pigment which contains no harmful elements, and can exhibit an excellent infrared reflecting property; and a paint and a resin composition containing the black pigment.

EXAMPLES

The present invention is described in more detail by Examples. However, these Examples are only illustrative and not intended to limit the scope of the present invention. Meanwhile, various properties of the black pigments obtained the following Examples and Comparative Examples were measured by the following methods.

(1) The average particle diameter of the particles was expressed by an average value of particle diameters of 350 particles measured from a micrograph thereof.

(2) The plate ratio was measured by the following method. That is, 0.5 g of each sample and 0.5 mL of castor oil were intimately kneaded with each other by a Hoover's muller to form a paste. 4.5 g of clear lacquer was added to the obtained paste and was intimately kneaded to form a paint. The obtained paint was applied on a cast-coated paper by using a 150 μm (6-mil) applicator to produce a coating film piece (having a film thickness of about 30 μm). The plate surface diameter and thickness of about 350 particles were measured from a photograph obtained by magnifying a micrograph (×6000) of a section of the coating film piece which was cut perpendicular to an orientation surface thereof, four times in each of the longitudinal and transverse directions. The plate ratio was calculated by dividing the plate surface diameter by the thickness.

(3) The specific surface area was expressed by the value measured by a BET method.

(4) The contents of respective metal elements contained in the black pigment, were measured by a fluorescent X-ray analyzer "3063M Model" (manufactured by RIGAKU CORPORATION) according to JIS K0119 "General rule of fluorescent X-ray analysis".

(5) The amount of $Cr^{6+}$ was measured by an ICP emission spectrophotometer manufactured by SII NanoTechnology Inc., according to JIS K0102, 65.2.4 "ICP emission spectral analysis".

(6) The hue values ($L^*$, $a^*$ and $b^*$ values) of the black pigment were determined by measuring the hue of the coating film piece used for the above plate ratio measurement, by using a Multi-Spectro-Colour-Meter "MSC-IS-2D" (manufactured by SUGA TEST INSTRUMENTS CO., LTD.), and expressed by color specification indices ($L^*$, $a^*$ and $b^*$ values) according to JIS×8729.

(7) The reflectance of the black pigment in each of a visible light wavelength range and an infrared wavelength range was determined as follows. That is, reflectance values of the coating film piece used for the above plate ratio measurement in a wavelength range of 250 to 780 nm and a wavelength range of 780 to 2500 nm were respectively measured by using a spectrophotometer "UV-3100PC" manufactured by SHIMADZU CORPORATION, and the reflecting property was expressed by an average reflectance (%) of the values measured in each range.

Example 1

$BaCO_3$, $CoO$, $TiO_2$ and $Fe_2O_3$ were weighed, mixed with each other and then calcined in air at 1100° C. for 2 hr to obtain a calcined product having a composition represented by the formula: $BaCo_xTi_xFe_{12-2x}O_{19}$ wherein x is 0.9 (x=0.9). The resultant calcined product was pulverized, thereby obtaining a black pigment having an average particle diameter of 0.7 μm. It was confirmed that the Fe and Co contents in the obtained black pigment was 78.5 mol % and 6.9 mol %, respectively, on the basis of the whole metal elements contained in the black pigment.

Also, it was confirmed that the thus obtained black pigment exhibited an average reflectance of 7% in a visible light wavelength range of 250 to 780 nm and an average reflectance of 40% in an infrared wavelength range of 780 to 2500 nm.

Examples 2 to 5 and Comparative Examples 3 to 5

The same procedure as defined in Example 1 was conducted except that the raw materials and composition ratios thereof were changed variously, thereby obtaining black pigments. The essential production conditions are shown in Table 1, and various properties of the obtained infrared reflecting black pigments are shown in Table 2. Meanwhile, "magnetite" used in Comparative Example 5 is "MAT-305" produced by TODA KOGYO CORPORATION.

In the column "Crystal structure" of Table 2, "M type" means a magnetoplumbite type crystal structure, and "Spinel" means a spinel type crystal structure. Meanwhile, the $Cr^{6+}$ content of "less than 5 ppm" means that the content is below a detection limit of the measuring apparatus used.

TABLE 1

| Examples and Comparative Examples | Production of black pigment | |
|---|---|---|
| | Composition | Calcination temperature (° C.) |
| Example 1 | $BaCo_{0.9}Ti_{0.9}Fe_{10.2}O_{19}$ | 1100 |
| Example 2 | $Co_{0.75}Zn_{0.75}Fe_{2.0}O_4$ | 800 |
| Example 3 | $Co_{0.5}Mg_{0.5}Fe_{2.0}O_4$ | 1000 |
| Example 4 | $SrCo_{0.2}Ti_{0.2}Fe_{11.6}O_{19}$ | 1150 |
| Example 5 | $Co_{0.5}Mg_{0.5}Fe_{2.0}O_4$ | 800 |
| Comparative Example 3 | $Co_{1.5}Zn_{0.5}O_3$ | 1150 |
| Comparative Example 4 | $BaFe_{12}O_{19}$ | 1100 |
| Comparative Example 5 | $Fe_3O_4$ | — |

TABLE 2

| Examples and Comparative Examples | Properties of infrared reflecting black pigment | | | |
|---|---|---|---|---|
| | Crystal structure | Particle shape | Average particle diameter (μm) | Thickness (μm) |
| Example 1 | M type | Plate-shaped | 0.7 | 0.5 |
| Example 2 | Spinel | Plate-shaped | 0.7 | 0.2 |
| Example 3 | Spinel | Plate-shaped | 0.7 | 0.1 |
| Example 4 | M type | Plate-shaped | 1.0 | 0.5 |
| Example 5 | Spinel | Plate-shaped | 0.08 | 0.03 |
| Comparative Example 3 | — | Plate-shaped | 1.0 | 0.7 |
| Comparative Example 4 | M type | Plate-shaped | 0.8 | 0.6 |
| Comparative Example 5 | Spinel | Granular | 0.5 | 0.5 |

| Examples and Comparative Examples | Properties of infrared reflecting black pigment | | |
|---|---|---|---|
| | Plate ratio (particle diameter/thickness) | BET specific surface area value (m²/g) | $Cr^{6+}$ content (ppm) |
| Example 1 | 1.4 | 4.5 | less than 5 ppm |
| Example 2 | 3.5 | 6.0 | less than 5 ppm |
| Example 3 | 7.0 | 4.0 | less than 5 ppm |
| Example 4 | 2.0 | 2.1 | less than 5 ppm |
| Example 5 | 2.5 | 18.0 | less than 5 ppm |
| Comparative Example 3 | 1.4 | 2.5 | less than 5 ppm |
| Comparative Example 4 | 1.3 | 3.0 | less than 5 ppm |
| Comparative Example 5 | 1.0 | 5.0 | less than 5 ppm |

TABLE 2-continued

| Examples and Comparative Examples | Properties of infrared reflecting black pigment Hue | | Properties of coating film (reflectance %) | |
|---|---|---|---|---|
| | Blackness (L*) | a* | Visible range (250-780 nm) | Infrared range (780-2500 nm) |
| Example 1 | 12.2 | 1.0 | 7 | 40 |
| Example 2 | 24.0 | 4.0 | 5 | 47 |
| Example 3 | 11.3 | 1.0 | 9 | 35 |
| Example 4 | 15.6 | 3.0 | 9 | 38 |
| Example 5 | 27.0 | 2.0 | 9 | 37 |
| Comparative Example 3 | 27.0 | 7.0 | 9 | 15 |
| Comparative Example 4 | 33.0 | 5.0 | 9 | 10 |
| Comparative Example 5 | 10.0 | 2.0 | 9 | 9 |

Example 6

CoO, $Al_2O_3$, MgO and $Fe_2O_3$ were weighed, mixed with each other and then calcined in air at 1100° C. for 2 hr to obtain a calcined product having a composition represented by the formula: $CoO_x MgO_x \cdot n[(Fe_y Al_{1-y})_2 O_3]$ wherein x is 0.5, y is 0.5 and n is 1 (x=0.5, y=0.5 and n=1). The resultant calcined product was pulverized, thereby obtaining a black pigment having an average particle diameter of 0.7 μm. It was confirmed that the thus obtained black pigment had a spinel-type crystal structure. The thus obtained black pigment exhibited an average reflectance of 7% in a visible light wavelength range of 250 to 780 nm and an average reflectance of 40% in an infrared wavelength range of 780 to 2500 nm.

Example 7 and Comparative Examples 6, 9 and 10

The same procedure as defined in Example 6 was conducted except that the raw materials and composition ratios thereof were changed variously, thereby obtaining black pigments. The essential production conditions are shown in Table 3, and various properties of the obtained black pigments are shown in Table 4.

Example 8

The same procedure as defined in Example 6 was conducted except that the raw materials and composition ratios thereof were changed, thereby obtaining a black pigment. Next, the thus obtained black pigment was wet-dispersed in water to obtain a slurry thereof. While maintaining the slurry of the black pigment at 70° C. and dropping 1% by weight of a water glass thereinto, the pH value of the slurry was adjusted to 7 with hydrochloric acid and sodium hydroxide, and then the slurry was allowed to stand for one hour. Thereafter, the obtained black pigment was subjected to water-washing, drying and pulverization treatments, thereby obtaining a coated black pigment. The essential production conditions are shown in Table 3, and various properties of the obtained infrared reflecting black pigment are shown in Table 4.

Example 9

The same procedure as defined in Example 8 was conducted except that the raw materials and composition ratios thereof as well as the surface treatment agents were changed, thereby obtaining a coated black pigment. The essential production conditions are shown in Table 3, and various properties of the obtained infrared reflecting black pigment are shown in Table 4. Meanwhile, in Table 4, "Spinel" appearing in the column "Crystal structure" means a spinel-type crystal structure, and the $Cr^{6+}$ content of "less than 5 ppm" means that the content is below a detection limit of the measuring apparatus used.

TABLE 3

| Examples and Comparative Examples | Production of black pigment | | | |
|---|---|---|---|---|
| | Composition | Calcination temperature (° C.) | Surface treatment Kind | wt % |
| Example 6 | $Co_{0.5}Mg_{0.5}Fe_{1.0}Al_{1.0}O_4$ | 1100 | None | 0 |
| Example 7 | $Co_{1.5}Mg_{0.5}Fe_{1.0}Al_{2.0}O_4$ | 800 | None | 0 |
| Example 8 | $Co_{1.0}Zn_{1.0}Fe_{1.0}Al_{0.5}O_4$ | 1000 | Si | 1.0 |
| Example 9 | $Co_{0.2}Ti_{0.2}Fe_{0.5}Al_{1.5}O_4$ | 1150 | Al | 1.0 |
| Comparative Example 6 | $Co_{1.0}Fe_{2.0}O_4$ | 1250 | None | 0 |
| Comparative Example 9 | $Co_{0.5}Mg_{0.5}Al_{2.0}O_4$ | 1100 | None | 0 |
| Comparative Example 10 | $Mg_{1.0}Fe_{1.0}Al_{1.0}O_4$ | 1200 | None | 0 |

TABLE 4

| | Properties of infrared reflecting black pigment | | | |
|---|---|---|---|---|
| Examples and Comparative Examples | Composition (molar ratio based on whole metal elements) | | | |
| | Fe | Co | Al | Other metals |
| Example 6 | 0.33 | 0.17 | 0.33 | 0.17 |
| Example 7 | 0.20 | 0.30 | 0.40 | 0.10 |
| Example 8 | 0.29 | 0.29 | 0.14 | 0.29 |
| Example 9 | 0.21 | 0.08 | 0.63 | 0.08 |
| Comparative Example 6 | 0.67 | 0.33 | — | — |
| Comparative Example 9 | — | 0.17 | 0.67 | 0.17 |
| Comparative Example 10 | 0.33 | — | 0.33 | 0.33 |

| | Properties of infrared reflecting black pigment | | | |
|---|---|---|---|---|
| Examples and Comparative Examples | Crystal structure | Average particle diameter (μm) | BET specific surface area value (m²/g) | $Cr^{6+}$ content (ppm) |
| Example 6 | Spinel | 0.7 | 4.5 | less than 5 ppm |
| Example 7 | Spinel | 0.09 | 19.0 | less than 5 ppm |
| Example 8 | Spinel | 0.7 | 4.0 | less than 5 ppm |
| Example 9 | Spinel | 1.0 | 2.1 | less than 5 ppm |
| Comparative Example 6 | Spinel | 1.1 | 1.5 | less than 5 ppm |
| Comparative Example 9 | Spinel | 0.8 | 3.0 | less than 5 ppm |
| Comparative Example 10 | Spinel | 1.0 | 2.8 | less than 5 ppm |

| | Properties of infrared reflecting black pigment Hue | | | Properties of coating film (reflectance %) | |
|---|---|---|---|---|---|
| Examples and Comparative Examples | Blackness (L*) | a* | b* | Visible range (250-780 nm) | Infrared range (780-2500 nm) |
| Example 6 | 15.2 | 1.0 | 1.0 | 7 | 40 |
| Example 7 | 24.0 | 0.7 | -0.3 | 5 | 47 |
| Example 8 | 11.3 | 3.0 | 4.0 | 9 | 35 |
| Example 9 | 15.6 | 3.0 | 5.0 | 9 | 38 |
| Comparative Example 6 | 9.8 | 1.0 | 0.5 | 7 | 20 |
| Comparative Example 9 | 44 | 20 | -60 | 35 | 10 |
| Comparative Example 10 | 40 | 10 | 5.0 | 25 | 25 |

What is claimed is:

1. An infrared reflecting black pigment comprising a composite oxide containing Fe, Co and Al, said black pigment having an average particle diameter of 0.02 to 5.0 μm and a blackness (L* value) of not more than 30, wherein said black pigment has an Fe content of 10 to 90 mol %, a Co content of 1.0 to 70 mol %, an Al content of 1.0 to 70 mol % and a total content of Fe, Co and Al of 20 to 98 mol % on the basis of whole metal elements contained in the black pigment.

2. An infrared reflecting black pigment according to claim 1, wherein said black pigment has an Fe content of 10 to 90 mol % and a Co content of 1.0 to 70 mol % on the basis of whole metal elements contained in the black pigment.

3. An infrared reflecting black pigment according to claim 1, wherein said black pigment has a spinel-type or magnetoplumbite-type crystal structure.

4. An infrared reflecting black pigment according to claim 1, wherein said black pigment has an average reflectance of not more than 10% in a visible light wavelength range of 250 to 780 nm and an average reflectance of not less than 35% in an infrared wavelength range of 780 to 2500 nm.

5. An infrared reflecting black pigment according to claim 1, wherein said black pigment has a plate shape.

6. An infrared reflecting black pigment according to claim 1, wherein said black pigment has an average particle diameter of 0.20 to 5.0 μm.

7. An infrared reflecting black pigment according to claim 1, wherein the composite oxide further contains at least one metal selected from the group consisting of Mg, Ca, Sr, Ba, Ti, Zn, Sn, Zr, Si and Cu.

8. An infrared reflecting black pigment according to claim 7, wherein said black pigment has a spinel-type crystal structure.

9. An infrared reflecting black pigment according to claim 7, wherein a content of the at least one metal selected from the group consisting of Mg, Ca, Sr, Ba, Ti, Zn, Sn, Zr, Si and Cu in the black pigment is 1.0 to 60 mol % on the basis of whole metal elements contained in the black pigment.

10. An infrared reflecting black pigment according to claim 1, wherein a surface of said black pigment is coated with a compound containing at least one element selected from the group consisting of Si, Al, Zr and Ti.

11. An infrared reflecting black pigment according to claim 10, wherein said compound is coated in an amount of 0.1 to 10% by weight on the basis of a weight of the black pigment.

12. A paint comprising the infrared reflecting black pigment as defined in claim 1.

13. A resin composition comprising the infrared reflecting black pigment as defined in claim 1.

14. An infrared reflecting black pigment comprising a composite oxide containing Fe, Co and Al, said black pigment having an average particle diameter of 0.02 to 5.0 μm, a blackness (L* value) of not more than 30 and a plate ratio (particle diameter/thickness) of 1.2:1 to 20.0:1.

* * * * *